Aug. 2, 1966 J. T. LINGLE 3,264,577
REDUNDANT SEMICONDUCTOR INVERTER CIRCUIT
Filed Oct. 25, 1963
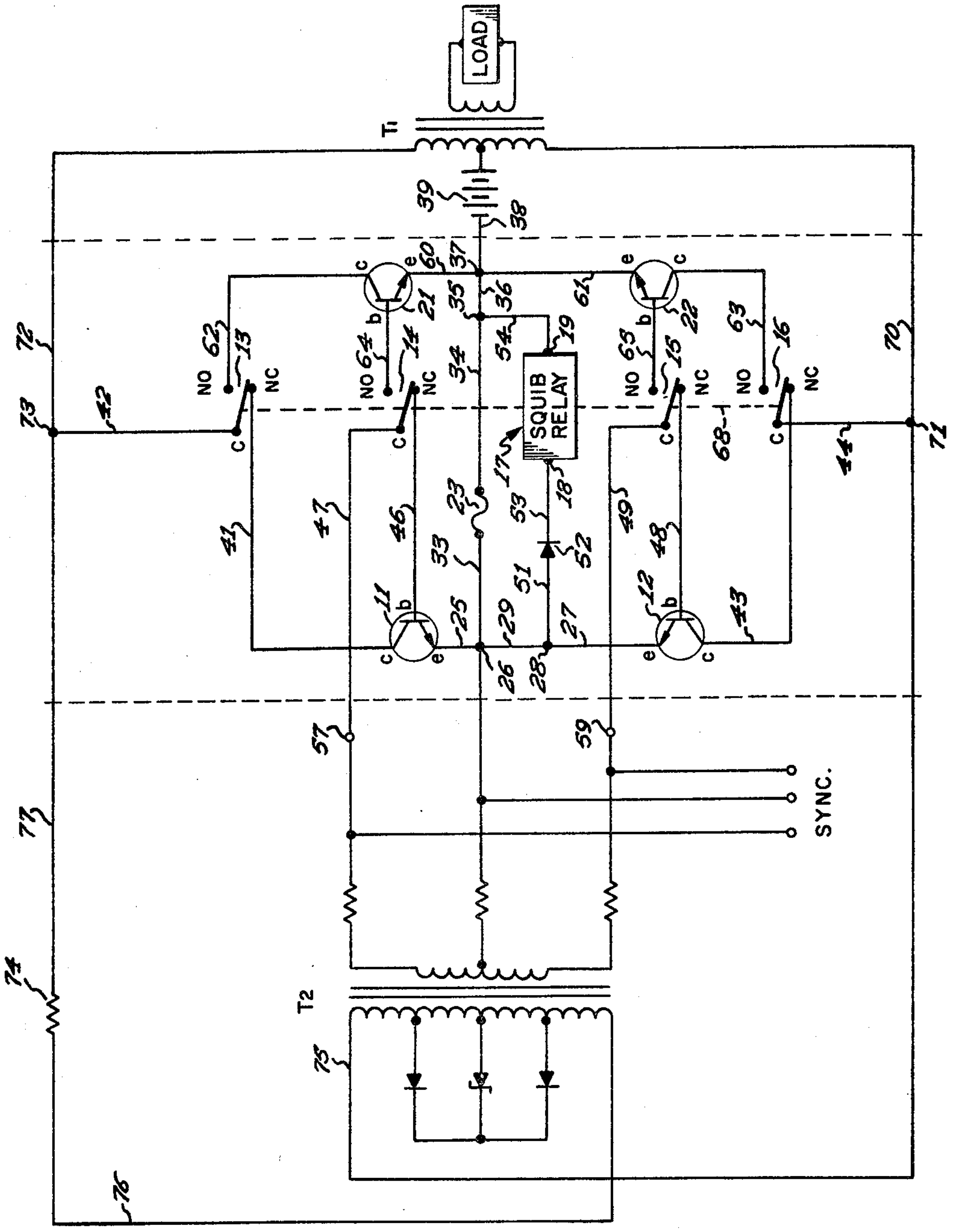
INVENTOR.
JOHN T. LINGLE
BY Omund R. Dahle
ATTORNEY United States Patent Office 3,264,577
Patented August 2, 1966

3,264,577

REDUNDANT SEMICONDUCTOR INVERTER CIRCUIT

John T. Lingle, Bloomington, Minn., assignor to Honeywell Inc., a corporation of Delaware Filed Oct. 25, 1963, Ser. No. 319,017
7 Claims. (Cl. 331—49)

This invention is concerned with semiconductor control apparatus and more particularly with improved condition responsive apparatus which includes transistor switching devices for providing redundant semiconductor apparatus for adjusting the condition.

Redundant circuits are well known in the art. However most such redundant circuits take the form of parallel connected circuits with such obvious disadvantages as multiplied power usage, and multiple fusing. A few circuits have employed generally a method of switching from one circuit to a stand-by circuit, but such circuits have relied on voltage changes, and have concerned vacuum tube amplifiers. This invention is novel in the replacement of shorted transistors, and in the sensing of excessive current to determine the need for replacement.

An object of this invention is to provide an improved method of making a redundant circuit available in the event of failure of the original circuit.

A further object of this invention is to provide a redundant transistor circuit available in the event of excessive current in the original transistor circuit.

A further object of this invention is to provide a redundant transistor complex available to replace an original transistor complex, when a current sensing unit indicates excessive current in the original complex.

These and other objects of the invention will become apparent upon consideration of the accompanying claims, specification and drawing, of which the single figure of the drawing is a schematic representation of a typical oscillator in which the dotted lines enclose an embodiment of the invention.

Referring to the drawing, there is shown a typical oscillator which includes: an output transformer T1 with a center tapped primary winding and a secondary output winding; a control circuit including a pair of transistors 11 and 12; a current limiting impedance 74; and a saturable core feedback transformer T2. The invention itself is enclosed between the dotted lines of the drawing and includes: a pair of transistors 11 and 12, connected to four double pole, single throw relay contacts 13, 14, 15 and 16, of a latching relay 17 which will lock on when actuated, such as an explosive squib relay, a second pair of transistors 21 and 22 also connected to the relay contacts 13, 14, 15 and 16, of relay 17; and a fuse 23 in the input electrode current paths of the first pair of transistors 11 and 12. The emitter or input electrode 11*e* of a transistor 11 is connected through a conductor 25 to a junction 26. The emitter or input electrode 12*e* of a transistor 12 is also connected to junction 26 through a conductor 27, a junction 28, and a conductor 29. Junction 26 is further connected through a conductor 33 to one terminal of a fuse 23, and from the other terminal of the fuse 23 through a conductor 34 to a junction 35, thence through a conductor 36 to a junction 37, and through a conductor 38 to the negative terminal of a source of potential 39. The collector or output electrode 11*c* of transistor 11 is connected through a conductor 41 to a "normally closed" terminal 13*nc* of a relay contact 13. A "common" terminal 13*c* of relay contact 13 is connected through conductor 42, junction 73, conductor 72, and through the upper half of the primary winding of transformer T1 to the positive terminal of the source of potential 39. The collector or output electrode 12*c* of transistor 12 is connected through a conductor 43 to a "normally closed" terminal 16*nc* of a relay contact 16. A "common" terminal 16*c* of relay contact 16 is connected through a conductor 44, junction 71, conductor 70, and through the lower half of the primary winding of transformer T1 to the positive terminal of the source of potential 39. The base or control electrode 11*b* of transistor 11 is connected through a conductor 46 to a "normally closed" terminal 14*nc* of a relay contact 14. A "common" terminal 14*c* of relay contact 14 is connected through a conductor 47 to a junction 57 which is the source of signal control from the secondary of the feedback transformer T2. The base or control electrode 12*b* of a transistor 12 is connected through a conductor 48 to a "normally closed" terminal 15*nc* of a relay contact 15. A "common" terminal 15*c* of relay contact 15 is connected through a conductor 49 to a junction 59, which is a second source of signal control from the secondary winding of the feedback transformer T2. A relay coil 17 is connected in parallel with fuse 23 through a conductor 51 from junction 28 to one electrode of a diode 52, and from the other electrode of diode 52 through a conductor 53 to a terminal 18 of relay coil 17. Another terminal 19 of relay coil 17 is connected through a conductor 54 to junction 35. A primary winding of the feedback transformer T2 is connected to the circuit by means of a conductor 76 from the lower terminal of the primary winding through a current limiting impedance 74, and a conductor 77, to junction 73. A conductor 75 from the upper terminal of the primary winding is connected directly to junction 71.

In the redundant circuit, the emitter or input electrode 21*e* of a transistor 21 is connected through a conductor 60 to a junction 37. The emitter or input electrode 22*e* of a transistor 22 is connected through a conductor 61 to junction 37. The collector or output electrode 21*c* of a transistor 21 is connected through a conductor 62 to a "normally open" terminal 13*no* of relay contact 13. The collector or output electrode 22*c* of transistor 22 is connected through a conductor 63 to a "normally open" terminal 16*no* of relay contact 16. The base or control electrode 21*b* of transistor 21 is connected through a conductor 64 to a "normally open" terminal 14 *no* of relay contact 14. The base or control electrode 22*b* of transistor 22 is connected through a conductor 65 to a "normally open" terminal 15*no* of relay contact 15. The four relay contacts 13, 14, 15 and 16 are mechanically linked together by a linkage 68. Linkage 68 is electromagnetically actuated by relay coil 17.

For normal operation of the oscillator shown in the drawing, assume that transistor 11 has a greater leakage current than transistor 12. This current will cause a voltage to appear on the primary winding of transformer T1, thereby tending to induce voltage on the secondary winding of transformer T1 and the primary winding of feedback transformer T2. A voltage is thereby induced on the secondary winding of transformer T2 in such a polarity that the base 11*b* of transistor 11 is made slightly positive with respect to the emitter 11*e*. This positive biasing of transistor 11 will cause a greater current flow through the primary winding of transformer T1, which will in turn be felt on feedback transformer T2 and regeneratively coupled to the input electrodes of transistor 11. This action which leads to full conduction of transistor 11 and cutoff of transistor 12, while described as cumulative, happens almost instantaneously upon connecting the D.C. potential 39 to the circuit. A current path can be traced from the positive terminal of source 39 through the upper parts of the primary winding of transformer T1, conductor 72, junction 73, conductor 42, through the "normally closed" terminals of relay contact 13, conductor 41, through transistor 11 from collector to emitter, conductor 25, junction 26, conductor 33, through fuse 23, conductor 34, junction 35, conductor 36, junction 37, and conductor 38 back to the negative terminal of source 39.

The current flowing in transistor 11 and the feedback circuit will continue until such time as the transformer T2 reaches saturation of the core. At this point the shunt impedance of the transformer T2 decreases, causing an increase of feedback current. This increase in feedback current causes an additional voltage drop across current limiting impedance 74, thereby decreasing the voltage drop across the primary winding of transformer T2, tending to decrease the bias voltage induced to the input electrodes of transistor 11, thus reducing the current flowing through the primary winding of transformer T1. The resulting flux change in T1 will cause a voltage of the opposite polarity to be produced in its winding. This voltage is fed back through transformer T2 and causes transistor 11 to be cut off and transistor 12 to become conductive. The second half of the cycle now continues until the core of the transformer T2 saturates in the reverse direction, completing the second half cycle, whereupon the initial state again resumes and the cycle repeats.

If the oscillator is operating normally as described above, it can be seen that when either transistor 11 or 12 is conducting, since fuse 23 is of a very low impedance, virtually all of the current will pass through the fuse 23. Thus, the one-shot relay coil 17 does not receive enough current to actuate the linkage 68. However, if one of the transistors should short, causing an excess current flow in conductor 33, fuse 23 will open, allowing said excess current to flow through the relay coil 17, thus actuating linkage 68, which in turn actuates the four double pole, single throw relay contacts 13, 14, 15 and 16. As can be seen in the drawing, when the "common" arm of the relay contacts 13, 14, 15 and 16 is switched from the "normally closed" terminals to the "normally open" terminals, the first pair of transistors 11 and 12, with its defective transistor, is completely removed from the oscillator circuit and completely replaced by the second or "redundant" pair of transistors 21 and 22. Once activated, the relay 17 will remain in the activated position. The total oscillation current will flow through the relay coil 17. The redundant pair of transistors 21 and 22 will allow the oscillator to again begin its cycle as described above. The infirmity in the original pair of transistors 11 and 12 can have no effect on the circuit. If desired, a fifth relay contact could be added to provide visual indication of which of the original or redundant circuit is in operation.

It will be obvious that the general principles herein disclosed may be embodied in many other organizations widely different from those illustrated, without departing from the spirit of the invention as defined in the following claims.

I claim as my invention:

1. A composite semiconductor condition responsive means comprising: a first semiconductor circuit, said first circuit having at least one semiconductor device with input, output and control electrodes; first and second switching means; electromechanical means for actuating said first and second switching means in unison; means connecting said output electrode to a first terminal of said first switching means; means connecting said control electrode to a first terminal of said second switching means; current sensing means; means connecting said input electrode to said current sensing means; first and second power input terminals; a signal input terminal; means connecting said first power input terminal to a common terminal of said first switching means; means connecting said signal input terminal to a common terminal of said second switching means; means connecting said second power input terminal to said current sensing means; means connecting said actuating means in parallel with said current sensing means, such that said actuating means acts on command from said current sensing means; a second semiconductor circuit, said second circuit being redundant to said first semiconductor circuit, thus having at least one semiconducotr device with input, output and control electrodes; means connecting said second circuit input electrode to said second power input terminal; means connecting said second circuit output electrode to a second terminal of said first switching means; and means connecting said second circuit control electrode to a second terminal of said second switching means.

2. A composite semiconductor condition responsive means comprising: a first transistor circuit, said first circuit having at least one transistor device with emitter, collector and base electrodes; first and second switching means; electromechanical means for actuating said first and second means in unison; means connecting said collector electrode to a first terminal of said first switching means; means connecting said base electrode to a first terminal of said second switching means; current sensing means; means connecting said emitter electrode to said current sensing means; first and second power input terminals; a signal input terminal; means connecting said first power input terminal to a common terminal of said first switching means; means connecting said second power input terminal to said current sensing means; means connecting said actuating means in parallel with said current sensing means, such that said actuating means acts on command from said current sensing means; a second transistor circuit, said second circuit being redundant to said first transistor circuit, thus having at least one transistor device with emitter, collector and base electrodes; means connecting said second circuit emitter electrode to said second power input terminal; means connecting said second circuit collector electrode to a second terminal of said first switching means; means connecting said second circuit base electrode to a second terminal of said second switching means; and means connecting said signal input terminal to a common terminal of said second switching means.

3. A composite semiconductor condition responsive means comprising: a first semiconductor circuit, said first circuit having at least one semiconductor device with input, output and control electrodes; first and second double pole, single throw relay contacts; a relay coil for actuating said first and second relay contacts in unison; means connecting said output electrode to a first terminal of said first relay contact; means connecting said control electrode to a first terminal said second relay contact; current sensing means; means connecting said input electrode to said current sensing means; first and second power input terminals; a signal input terminal; means connecting said first power input terminal to a common terminal of said first relay contact; means connecting said signal input terminal to a common terminal of said second relay contact; means connecting said second power input terminal to said current sensing means; means connecting said relay coil in parallel with said current sensing means; such that said relay coil is actuated on command from said current sensing means; a second semiconductor circuit, said second circuit being redundant to said first semiconductor circuit, thus having at least one semiconductor device with input, output and control electrodes; means connecting said second circuit input electrode to said second power input terminal; means connecting said second circuit output electrode to a second terminal of said first relay contact; and means connecting said second circuit control electrode to a second terminal of said second relay contact.

4. A composite semiconductor condition responsive means comprising: a first semiconductor circuit, said first circuit having at least one transistor device with emitter, collector and base electrodes; first and second double pole, single throw relay contacts; a relay coil for actuating said first and second relay contacts in unison; means connecting said collector electrode to a first terminal of said first relay contact; means connecting said base electrode to a first terminal of said second relay contact; a fuse; means connecting said emitter electrode to said fuse; first and second power input terminals; a signal input terminal; means connecting said first power input terminal to a common terminal of said first relay contact; means connecting said signal input terminal to a common terminal of said second relay contact; means connecting said second power input terminal to said fuse; means connecting said relay coil in parallel with said fuse, such that said relay coil is actuated when said fuse is opened by excessive current; a second semiconductor circuit; said second circuit being redundant to said first semiconductor circuit, thus having at least one transistor device with emitter, collector and base electrodes; means connecting said second circuit input electrode to said second power input terminal; means connecting said second circuit collector electrode to a second terminal of said first relay contact; and means connecting said second circuit base electrode to a second terminal of said second relay contact.

5. A composite semiconductor condition responsive means comprising: a first pair of semiconductor current controlling devices each having input, output and control electrodes, said first pair of devices being the same conductivity type; excessive current sensing means; means connecting a first terminal of said excessive current sensing means to said input electrodes of both of said first pair of devices; means connecting a second terminal of said excessive current sensing means to a first source of potential; a second pair of semiconductor current controlling devices each having input, output and control electrodes, said second pair of devices being of the same conductivity type as said first pair of devices; means connecting said input electrodes of both of said second pair of devices to the first source of potential; a first switching device; means connecting said output electrode of the first semiconductor device of said first pair of devices to a first terminal of said first switching device; means connecting said output electrode of the first semiconductor device of said second pair of devices to a second terminal of said first switching device; means connecting a common terminal of said first switching device to a second source of potential; a second switching device; means connecting said output electrode of the second semiconductor device of said first pair of devices to a first terminal on said second switching device; means connecting said output electrode of the second semiconductor device of said second pair of devices to a second terminal on said second switching device; means connecting a common terminal of said second switching device to said second source of potential; a third switching device; means connecting said control electrode of said first semiconductor device of said first pair of devices to a first terminal on said third switching device; means connecting said control electrode of said first semiconductor device of said second pair of devices to a second terminal on said third switching device; means connecting a common terminal on said third switching device to a first source of control signal; a fourth switching device; means connecting said control electrode of said second semiconductor device of said first pair of devices to a first terminal on said fourth switching device; means connecting said control electrode of said second semiconductor device of said second pair of devices to a second terminal on said fourth switching device; means connecting a common terminal on said fourth switching device to a second source of control signal; electromagnetic means actuating all four of said switching devices in unison, and means connecting said electromagnetic means in parallel with said excessive current sensing means, such that said actuating means acts on command from said excessive current sensing means.

6. A composite semiconductor condition responsive means comprising: a first pair of transistor devices each having emitter, collector and base electrodes, said first pair of devices being of the same conductivity type; excessive current sensing means; means connecting a first terminal of said excessive current sensing means to said emitter electrodes of both of said first pair of devices; means connecting a second terminal of said excessive current sensing means to a first source of potential; a second pair of transistor devices each having emitter, collector and base electrodes, said second pair of transistor devices being of the same conductivity type as said first pair of transistor devices; means connecting said emitter electrodes of both of said second pair of devices to said first source of potential; a first switching device; means connecting said collector electrode of the first transistor device of said first pair of devices to a first terminal of said first switching device; means connecting said collector electrode of the first transistor device of said second pair of devices to a second terminal of said first switching device; means connecting a common terminal of said first switching device to a second source of potential; a second switching device; means connecting said collector electrode of the second transistor device of said first pair of devices to a first terminal on said second switching device; means connecting said collector electrode of the second transistor device of said second pair of devices to a second terminal on said second switching device; means connecting a common terminal of said second switching device to said second source of potential; a third switching device; means for connecting said base electrode of said first transistor device of said first pair of devices to a first terminal on said third switching device; means connecting said base electrode of said first transistor device of said second pair of devices to a second terminal on said third switching device; means connecting a common terminal on said third switching device to a first source of control signal; a fourth switching device; means connecting said base electrode of said second transistor device of said first pair of devices to a first terminal on said fourth switching device; means connecting said base electrode of said second transistor device of said second pair of devices to a second terminal on said fourth switching device; means connecting a common terminal on said fourth switching device to a second source of control signal; electromagnetic means for actuating all four of said switching devices in unison; and means connecting said electromagnetic means in parallel with said excessive current sensing means, such that said actuating means acts on command of said excessive current sensing means.

7. A composite semiconductor condition responsive means comprising: a first pair of transistor devices each having emitter, collector and base electrodes, said first pair of devices being of the same conductivity type; a fuse, means connecting a first terminal of said fuse to said emitter electrodes of both of said first pair of devices; means connecting a second terminal of said fuse to a first source of potential; a second pair of transistor devices each having emitter, collector and base electrodes, said second pair of devices being of the same conductivity type as said first pair of devices; means connecting said emitter electrode of both of said second pair of devices to said first source of potential; a first double pole, single throw relay contact; means connecting said collector electrode of the first transistor device of said first pair of devices to a normally closed terminal of said first relay contact; means connecting said collector electrode of the first transistor device of said second pair of devices to a normally open terminal of said first relay contact; means connecting a common terminal of said first relay contact to a second source of potential; a second double pole, single throw relay contact; means connecting said collector electrode of the second transistor device of said first pair of devices to a normally closed terminal on said second relay contact; means connecting said collector electrode of the second transistor device of said second pair of devices to a normally open terminal on said second relay contact; means connecting a common terminal on said second relay contact to said second source of potential; a third double pole, single throw relay contact; means connecting said base electrode of said first transistor device of said first pair of devices to a normally closed terminal on said third relay contact; means connecting said base electrode of said first transistor device of said second pair of devices to a normally open terminal on said third relay contact; means connecting a common terminal on said third relay contact to a first source of control signal; a fourth double pole, single throw relay contact; means connecting said base electrode of said second transistor device of said first pair of devices to a normally closed terminal on said fourth relay contact; means connecting said base electrode of said second transistor device of said second pair of devices to a normally open terminal on said fourth relay contact; means connecting a common terminal on said fourth relay contact to a second source of control signal; a relay coil capable of actuating all four of relay contacts in unison; and means connecting said relay coil in parallel with said fuse, such that said relay coil is actuated when the fuse opens due to excessive current.

References Cited by the Examiner

UNITED STATES PATENTS

| | | | |
|---|---|---|---|
| 2,270,771 | 1/1942 | Schonfeld | 331—49 X |
| 3,116,477 | 12/1963 | Bradbury | 331—49 X |

ROY LAKE, *Primary Examiner.*

S. H. GRIMM, *Assistant Examiner.*